N. MACNEALE.
SPOT LIGHT FOR AUTOMOBILES.
APPLICATION FILED DEC. 17, 1917.
1,304,787.
Patented May 27, 1919.
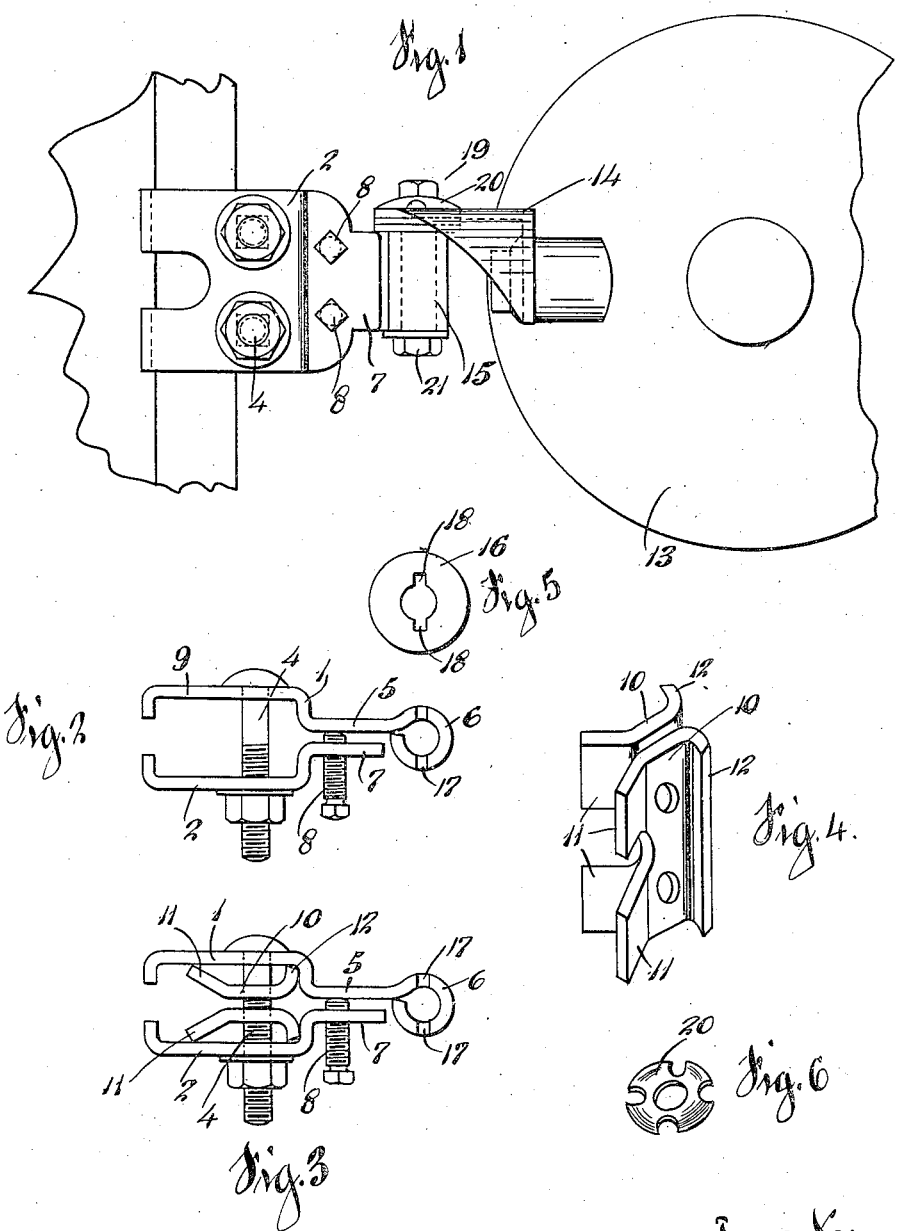

UNITED STATES PATENT OFFICE.

NEIL MACNEALE, OF CINCINNATI, OHIO, ASSIGNOR TO THE CORCORAN-VICTOR COMPANY, OF CINCINNATI, OHIO, A CORPORATION OF OHIO.

SPOT-LIGHT FOR AUTOMOBILES.

1,304,787.     Specification of Letters Patent.     Patented May 27, 1919.

Application filed December 17, 1917. Serial No. 207,431.

*To all whom it may concern:*

Be it known that I, NEIL MACNEALE, a citizen of the United States, and a resident of Cincinnati, in the county of Hamilton and State of Ohio, have invented certain new and useful Improvements in Spot-Lights for Automobiles, of which the following is a full, clear, and exact description, reference being had to the accompanying drawing, making part of this specification.

My invention relates to spot lights for automobiles and the like, wherein the essential parts are a small search-light, mounted on the frame of the auto wind shield, and having a pivoted connection with the mounting bracket so as to permit the driver of the car to shift it about.

It is the object of my invention to provide a bracket for such lamps which is capable of attachment to a large variety of shapes of automobile wind shield frames. This overcomes the difficulty which has been found in the art, which requires a different form of mounting bracket for the different makes of wind shields.

It is also my object to provide in connection with the bracket an improved swivel or pivot for the lamp, such that it can be shifted in a horizontal plane by the operator without a preliminary freeing of clamping screws and the like, and still will remain in shifted position in spite of the jarring of the vehicle.

These objects and other advantages, such as strong and compact structure generally, I accomplish by that certain construction and arrangement of parts to be hereinafter more specifically pointed out and claimed, wherein more particularly the mounting bracket will be attachable to square, round, rectangular, oval and odd shaped frames or bars.

In the drawing;

Figure 1 is a rear elevation of the lamp in place at the right hand side of a wind shield.

Fig. 2 is a plan view of the bracket, as mounted over a rectangular or square frame.

Fig. 3 is a like view of the bracket, as mounted over oval, round or odd shaped frames.

Fig. 4 is a perspective view of the filler plates.

Fig. 5 is a plan view of the washer plate, and Fig. 6 is a perspective view of the spring washer.

The bracket comprises two pieces 1 and 2 of stout metal, each piece terminating with a U-shaped portion. The two U-shaped portions are drawn together over the supported bar or rod, to which the bracket is to be secured, by means of bolts 4, 4, preferably two in number.

The piece 1 has beside the U-shaped, or clamping end, a flat straight member 5, terminating in the socket or journal member 6. The piece 2 has also a flat end 7, but has no journal member, this being the only difference between the two members of the bracket. Between the portions termed flat plates of the bracket pieces are inserted the set screws 8, 8, for a purpose to be described.

When the bracket now detailed is to be mounted on a square or rectangular frame 9 (Fig. 2), the two members of the clamp portion are separated, brought over the frame and clamped around it by means of the bolts. The set screws are tightened down so as to prevent the two U-shaped members from getting out of parallel, and thus failing to get a firm grasp on the frame that is to serve as a support.

For purposes of use with rounded and odd shaped frames or bars in wind shields or the like, the two filler plates are provided. These plates have central portions 10, 10, which are set together when installing (Figs. 3 and 4), these central portions being pierced with holes to engage over the bolts 4, 4, of the clamp.

The clamping ends 11, 11, of the filler pieces are turned outwardly from the central portions, and the abutments 12, 12, of the plates are also turned outwardly and preferably at a right angle to the central portions.

In use the plates are set together with the bolts passing through the holes in the central portions thereof, in the inside of the clamping portion of the bracket. The clamping ends of jaws of the plates then form with the turned-in ends of the U-shaped pieces a sort of triangular assembly, the size of which can be regulated by the bolts 4, 4. The set screws, as has been noted, act to preserve the U-shaped or clamping portions of the bracket pieces in parallelism, and the abutment ends of the filler plates are so proportioned as to abut against the inner corners of these U-shaped members, thereby preserving the filler plates in parallelism also. Due to the engagement of the filler plates over the bolts, and the abutment of the ends of said plates in the U-shaped member corners, a very strong and rigid adjustable clamp is provided for odd shaped and rounded shaped bars or frameworks, such as are found in certain types of wind shields in automobiles.

The filler plates will be made up and sold as additional members for use with the brackets, if desired, and it is obvious that said filler plates must be made up in more or less exact relation to the shape of the U-shaped members of the bracket clamp. The space in the clamp behind the bolts thereof is left for the accommodation of the abutment ends of the filler plates, and the bolts must be fairly well fitted to the filler plates also.

In connection with the socket I provide means for a wide bearing surface of the spring washer that holds the lamp against revolution. The lamp 13 has the usual mounting member 14, of any desired type, which engages over a pivot bolt 15. This bolt seats revolubly in the socket piece of the bracket, and on the post is a slotted washer 16. The upper end of the socket portion has two lugs 17, 17, which engage in the ends 18, 18, of the slot in the washer. The washer is of considerably larger diameter than the upper end of the socket portion of the bracket, thereby providing a much larger bearing surface. The mounting member of the lamp is set over the bolt above the slotted washer, and set above the said mounting member and between it and the head 19 of the bolt is a spring washer 20.

When the nut 21 of the bolt is tightened up, after assembly of the parts as described, the spring washer will press the lamp mounting member against the wide bearing surface of the slotted washer, and will hold the lamp yieldably in position, so that it can be swung around as desired, but yet will not jar out of position unless positively moved by the operator.

It can be realized that by the above means, a frictional pivot for the lamp is provided which will be fully effective, without requiring an expensive construction of the socket member, since the slotted washer coöperates with the socket member to provide a more extensive bearing surface for the friction pivot than would be practical should the socket member be formed of metal which would be of sufficient thickness to provide a like result. The washer could be soldered in place, of course, but, although I consider this within my invention, I prefer the lug and slot construction for its strength and economy.

Having thus described my invention, what I claim as new and desire to secure by Letters Patent, is:—

1. The combination with a clamping device for the purpose described, having rectangular clamping jaws, and tightening bolts, of separate filler plates having angling clamping jaws adapted to engage the bolts to coöperate with the rectangular jaws.

2. A securing bracket for lamps comprising a pair of independent jaw clamping members, bolts passing through said clamping jaw members, and means for maintaining said jaw members in parallel with each other in addition to said bolts and separate filler plates mounted on the clamping members and adapted to fit between said jaws and having angling clamping jaws to coöperate with the jaw clamping members.

3. A securing bracket for lamps comprising a pair of U-shaped rectangular clamping jaws, means for bringing said jaws together to effect a clamping, and separate filler plates mounted on the clamping jaws and adapted to fit between said jaws and having angling clamping jaws to coöperate with the rectangular jaws.

4. A securing bracket for lamps comprising a pair of U-shaped rectangular clamping jaws, means for bringing said jaws together to effect a clamping, and filler plates adapted to fit between said jaws and having angling clamping jaws to coöperate with the rectangular jaws, said filler plates provided at their ends opposed to the angling jaws, with means for maintaining them in parallelism with each other.

NEIL MACNEALE.